(12) United States Patent
Hsu et al.

(10) Patent No.: US 7,006,420 B1
(45) Date of Patent: Feb. 28, 2006

(54) METHOD FOR TUNING WRITE STRATEGY PARAMETERS OF AN OPTICAL STORAGE DEVICE, AND SYSTEM THEREOF

(75) Inventors: Han-Wen Hsu, Hsin-Chu (TW); Chih-Ching Yu, Tao-Yuan Hsien (TW); Chih-Hsiung Chu, Taipei Hsien (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 0 days.

(21) Appl. No.: 10/906,397

(22) Filed: Feb. 17, 2005

(51) Int. Cl.
*G11B 7/00* (2006.01)

(52) U.S. Cl. .................. 369/59.12; 369/47.5; 369/116

(58) Field of Classification Search ............. 369/59.11, 369/59.12, 100, 116, 47.5, 47.53, 47.26, 44.13, 369/59.25, 59.2, 275.1–275.4, 53.26
See application file for complete search history.

(56) References Cited

U.S. PATENT DOCUMENTS

| | | | |
|---|---|---|---|
| 4,873,680 A | 10/1989 | Chung et al. | |
| 5,327,411 A | 7/1994 | Iwasa et al. | |
| 5,347,505 A | 9/1994 | Moritsugu et al. | |
| 5,631,887 A | 5/1997 | Hurst, Jr. | |
| 6,188,658 B1 | 2/2001 | Saga et al. | |
| 6,388,970 B1 | 5/2002 | Iizuka | |
| 6,574,178 B1 | 6/2003 | Tieke et al. | |
| 6,631,110 B1 | 10/2003 | Seo et al. | |
| 6,762,985 B1 | 7/2004 | Furukawa et al. | |
| 6,819,644 B1 * | 11/2004 | Sasaki et al. | 369/59.12 |
| 2003/0152006 A1 | 8/2003 | Ohkura et al. | |
| 2004/0130993 A1 | 7/2004 | Nadershahi | |
| 2004/0160874 A1 | 8/2004 | Hwang et al. | |

* cited by examiner

*Primary Examiner*—Ali Neyzari
(74) *Attorney, Agent, or Firm*—Winston Hsu

(57) ABSTRACT

A method, for tuning a plurality of write strategy parameters of an optical storage device, includes: detecting a plurality of lengths, each length corresponding to a pit or a land on an optical storage medium accessed by the optical storage device; performing calculations according to the lengths and a plurality of data set types to generate a plurality of calculation results respectively corresponding to the data set types, each of the data set types corresponding to a combination of at least a specific target pit length and a specific target land length or a combination of at least a specific target land length and a specific target pit length, the combination corresponding to a specific write strategy parameter; and utilizing the calculation results for tuning the write strategy parameters corresponding to the data set types, respectively.

28 Claims, 5 Drawing Sheets

METHOD FOR TUNING WRITE STRATEGY PARAMETERS OF AN OPTICAL STORAGE DEVICE, AND SYSTEM THEREOF

BACKGROUND

The present invention relates to write strategy tuning of an optical storage device, and more particularly, to a method for tuning write strategy parameters of an optical storage device, and a system thereof.

As multimedia applications progress prosperously, the demand for storing massive digital data increases rapidly. As a result, high storage volume and compact size optical storage media such as CD-R discs and DVD±R discs become more and more popular, and an optical storage device such as a CD drive or a DVD drive becomes a standard accessory of a personal computer utilized for performing the multimedia applications mentioned above.

Take the CD drive as an example. When the CD drive is controlled to write data to a CD-R disc, the writing power of a Laser Diode in the CD drive is usually set to be a specific value and writing pulses corresponding to the data are utilized for recording pits and lands onto the grooves of a CD-R disc. The specific value for the writing power can be derived from an optimal power calibration (OPC) process. On the other hand, through a write strategy tuning process, which is also referred to as a recording strategy tuning process, changing write strategy parameters for controlling widths of the writing pulses may increase the accuracy of lengths of the pits and the lands formed on the CD-R disc. Please refer to related documents of the CD-R specifications (e.g. the Orange Book Part I) for more information.

According to the related art, a specific device such as an oscilloscope can be utilized during the write strategy tuning process. Usually, an engineer or a researcher should determine, by experience, a new set of write strategy parameters for controlling the widths of the writing pulses according to an eye pattern of a plurality of reproduced waveforms shown on the oscilloscope after a trial writing process in advance. It takes lots of time of the engineer or the researcher to utilize this method since repeatedly performing the same process, including at least writing test data, watching an eye pattern of reproduced waveforms shown on the oscilloscope and determining a new set of write strategy parameters by experience according to the eye pattern, is required for each different kind of applicable media and for each different recording speed. The write strategy tuning process mentioned above is time consuming since watching eye patterns to determine write strategy parameters is not automatic. In addition, the write strategy tuning process mentioned above is implicit since determining a new set of write strategy parameters by experience according to the eye pattern is not quantitative. Under certain situations, an unclear eye pattern would invalidate or interfere the write strategy tuning process.

A specific instrument such as a time interval analyzer (TIA) or a jitter meter might be helpful for the same purpose of deriving information for determining a new set of write strategy parameters. However, similar routine work is also required, and if the TIA or the jitter meter is simply coupled for measuring without setting up an additional control system, the same problem that the write strategy tuning process is not automatic still exists. In addition, the information derived from the specific instrument is usually implicit and therefore takes up lots of an experienced engineer or researcher's time.

SUMMARY

Methods and systems for tuning a plurality of write strategy parameters of an optical storage device are provided. An exemplary embodiment of a method for tuning write strategy parameters of an optical storage device comprises: detecting a plurality of lengths, each length corresponding to a pit or a land on an optical storage medium accessed by the optical storage device; performing calculations according to the lengths and data set types to generate calculation results which respectively correspond to the data set types, where each of the data set types corresponds to a combination of at least a specific target pit length and a specific target land length or a combination of at least a specific target land length and a specific target pit length, the combination corresponding to a specific write strategy parameter; and utilizing the calculation results for tuning the write strategy parameters respectively corresponding to the data set types.

An exemplary embodiment of a system for tuning a plurality of write strategy parameters of an optical storage device comprises: a detector for detecting a plurality of lengths, each length corresponding to a pit or a land on an optical storage medium accessed by the optical storage device; a calculation module coupled to the detector for performing calculations according to the lengths and data set types to generate calculation results which respectively correspond to the data set types, where each of the data set types corresponds to a combination of at least a specific target pit length and a specific target land length or a combination of at least a specific target land length and a specific target pit length, the combination corresponding to a specific write strategy parameter; and a controller coupled to the detector and the calculation module, the controller utilizing the calculation results for tuning the write strategy parameters respectively corresponding to the data set types.

DETAILED DESCRIPTION

The present invention provides a system for tuning a plurality of write strategy parameters of an optical storage device. According to an aspect, the system is a circuit for tuning the write strategy parameters, where the circuit is positioned in the optical storage device. According to another aspect, the system is substantially the optical storage device itself. According to another aspect, the system comprises a combination of a computer and an optical storage device. Various aspects are explained herein according to different embodiments of the present invention.

Figure 1:
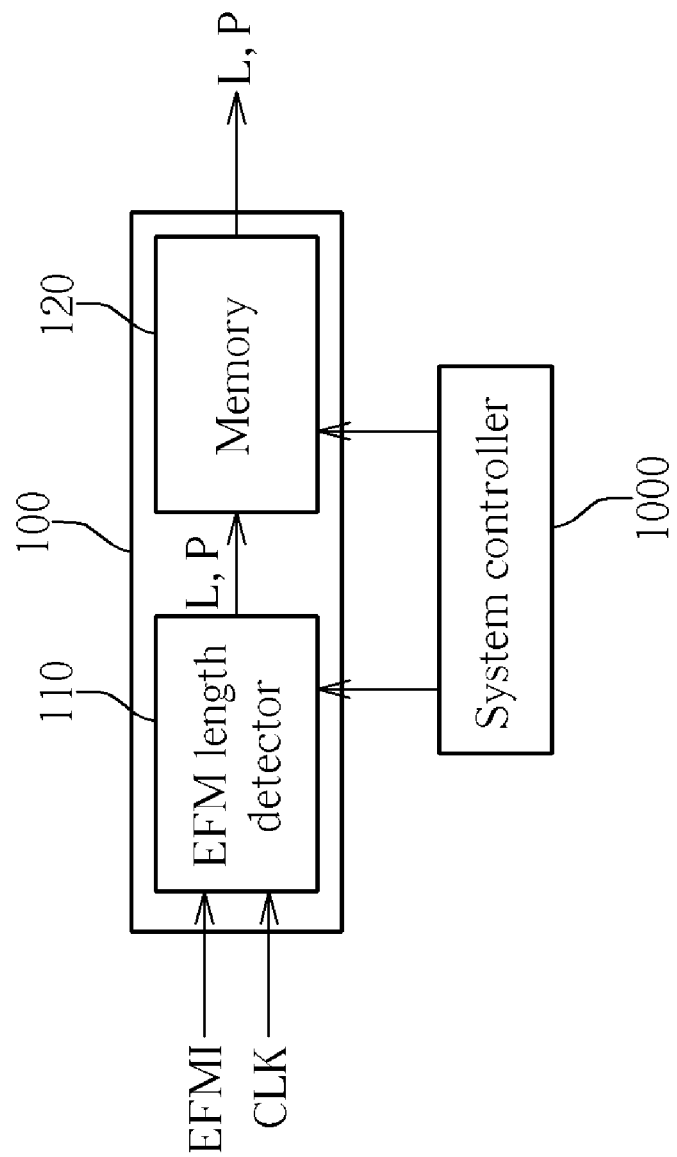
FIG. 1 is a diagram of a combination of a system controller and an eight-to-fourteen modulation (EFM) length measurement device according to an embodiment of the present invention.

Please refer to FIG. 1. FIG. 1 illustrates a diagram of a system controller 1000 coupled to an eight-to-fourteen modulation (EFM) length measurement device 100 according to a first embodiment of the present invention. The EFM length measurement device 100 is usually coupled to a slicer (not shown) of an optical storage device such as a CD drive. The slicer is capable of generating a sliced signal such as EFMI shown in FIG. 1 according to a reproduced signal such as a so-called RF signal representing data written on an optical storage medium. Operation and principles of the slicer is well known in the art and will not be described repeatedly here. Please note that for simplicity, this embodiment is described utilizing the CD-R disc as the optical storage medium and utilizing the CD drive as the optical storage device. Those skilled in the art should understand that other kinds of optical storage media such as a DVD±R disc and corresponding optical storage devices such as a DVD drive are applicable according to other embodiments of the present invention.

As shown in FIG. 1, the EFM length measurement device 100 includes an EFM length detector 110 and a memory 120. The EFM length detector 110 is capable of detecting lengths according to the sliced signal EFMI having the data written or recorded on the optical storage medium. The EFM length detector 110 typically detects intervals between rising edges and falling edges of the sliced signal as the lengths. Each interval corresponds to a pit or a land on the optical storage medium. As a result, the lengths mentioned above include pit lengths corresponding to pits and land lengths corresponding to lands. According to this embodiment, the sliced signal EFMI has EFM information. Each of the pit lengths mentioned above represents a pit recorded along a groove on the optical storage medium, and each of the land lengths mentioned above represents a land along the groove. Please note that the sliced signal of another embodiment of the present invention may have EFM plus (EFM+) information (e.g. for an embodiment of DVD-R) or other information complying with a variation of the EFM/EFM+ specification.

In the first embodiment, the pit lengths and the land lengths derived from the sliced signal EFMI have lengths ranging from 3 T to 11 T in an ideal case of the CD-R disc, wherein T represents a period of an EFM data clock. That is, a length P of a pit or a length L of a land can be 3 T, 4 T, ..., or 11 T. So it is reasonable that the reference clock CLK, which is a reference signal for measuring the lengths of the pits and the lands, has a period less than or equal to the period T of the EFM data clock. According to this embodiment, the period of the reference clock CLK is T/10. In a real case of the CD-R disc, the lengths L and P are usually not exact multiples of T. The memory 120 stores the lengths L and P detected by the EFM length detector 110 and outputs the lengths L and P as requested by the system controller 1000. Then a computer, which can be coupled to the optical storage device and executes an application program, or a micro-processing unit (MPU) executing a firmware code in the optical storage device may perform calculations according to the lengths L and P outputted from the memory 120 to generate a plurality of calculation results for tuning a plurality of write strategy parameters of the optical storage device.

It is noted that no matter the computer or the MPU is utilized for performing the calculations, the write strategy parameters can be tuned automatically according to the lengths since the specific device (e.g. the oscilloscope mentioned above) is not needed according to the present invention. In addition, if the computer is not utilized for performing the calculations, the write strategy parameters can be tuned automatically on system or on chip according to the present invention.

In the case that the computer executing the application program performs the calculations mentioned above to generate the calculation results for tuning the write strategy parameters, it is obvious that the computer executing the application program may send the calculation results back to the optical storage device, so the computer executing the application program or the MPU executing the firmware code may tune the write strategy parameters according to the calculation results. On the other hand, in the case that the MPU executing the firmware code performs the calculations mentioned above to generate the calculation results for tuning the write strategy parameters, the MPU may simply tune the write strategy parameters according to the calculation results generated by the MPU. Through tuning the write strategy parameters according to the calculation results derived from the lengths L and P, pit lengths or land lengths corresponding to data newly written on the optical storage medium utilizing the latest values of the write strategy parameters may approach multiples of T. Please note, as long as the implementation of the present invention is not hindered, the system controller 1000 can be the MPU executing the firmware code according to a variation of the first embodiment.

Figure 2:
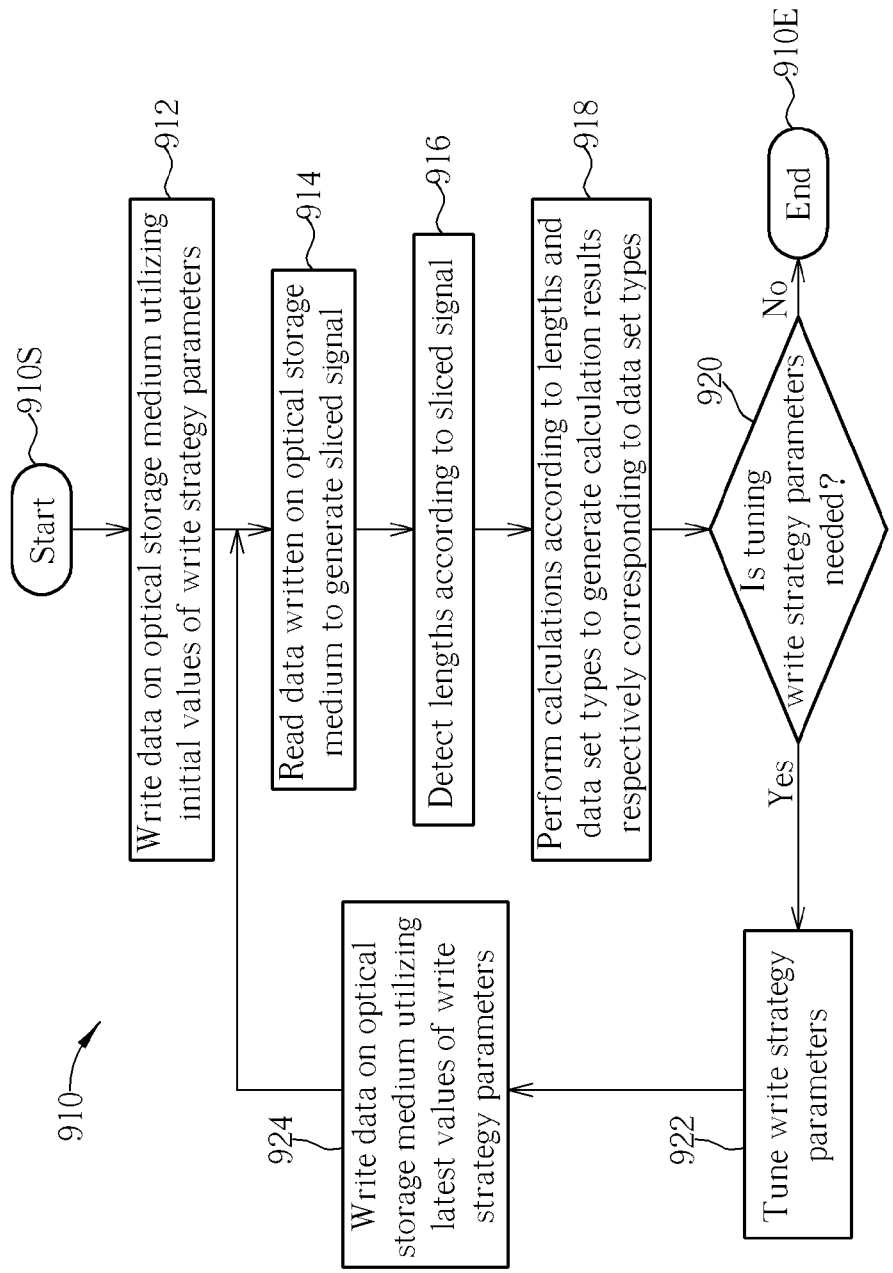
FIG. 2 is a flowchart of a method for tuning write strategy parameters of an optical storage device according to an embodiment of the present invention.

FIG. 2 illustrates a flowchart of a method 910 for tuning write strategy parameters of an optical storage device according to an embodiment of the present invention. Applying the method 910 utilizing the system shown in FIG. 1, the first embodiment can be described as follows according to the case that the MPU performs the calculations mentioned above.

In Step 912, under the control of the MPU (not shown) of the optical storage device, the optical storage device writes data on the optical storage medium utilizing initial values of the write strategy parameters corresponding to a specific value of the rotational speed of the optical storage device.

In Step 914, the optical storage device reads the data newly written on the optical storage medium to generate the sliced signal EFMI.

In Step 916, the EFM length detector 110 of the EFM length measurement device 100 detects lengths P of pits and lengths L of lands, respectively, according to the sliced signal EFMI.

In Step 918, the MPU executing the firmware code performs the calculations according to the lengths L and P detected in Step 916 and data set types ($L_{nT}$, $P_{mT}$) and ($P_{nT}$, $L_{mT}$) to generate the calculation results respectively corresponding to the data set types ($L_{nT}$, $P_{mT}$) and ($P_{nT}$, $L_{mT}$), where n=3, 4, ..., 11 and m=3, 4, ..., 11. Each of the data set types ($L_{nT}$, $P_{mT}$), e.g. a data set type ($L_{n0*T}$, $P_{m0*T}$) having n=n0 and m=m0, is utilized for classifying data sets (L, P) corresponding to a land having a target land length of n0*T followed by an adjacent pit having a target pit length of m0*T. In this embodiment, the data sets (L, P) are also referred to as the length sets (L, P). Similarly, each of the data set types ($P_{nT}$, $L_{mT}$), e.g. a data set type ($P_{n0*T}$, $L_{m0*T}$) having n=n0 and m=m0, is utilized for classifying data sets (P, L) corresponding to a pit having a target pit length of n0*T followed by an adjacent land having a target land length of m0*T. In this embodiment, the data sets (P, L) are also referred to as the length sets (P, L). It is noted that each of the data set types ($L_{nT}$, $P_{mT}$), e.g. the data set type ($L_{n0*T}$, $P_{m0*T}$), corresponds to a combination (n0*T, m0*T) of a specific target land length n0*T and a specific target pit length m0*T, and each of the data set types ($P_{nT}$, $L_{mT}$), e.g. the data set type ($P_{n0*T}$, $L_{m0*T}$), corresponds to a combination (n0*T, m0*T) of a specific target pit length n0*T and a specific target land length m0*T. As a result, the number of data set types ($L_{nT}$, $P_{mT}$) and ($P_{nT}$, $L_{mT}$) can be derived as follows:

$$9*9*2=162$$

The MPU may classify the data sets (L, P) to be of the data set type ($L_{n0*T}$, $P_{m0*T}$) if (n0−0.5)*T≦L≦(n0+0.5)*T and (m0−0.5)*T≦P≦(m0+0.5)*T.

Similarly, the MPU may classify the data sets (P, L) to be of the data set type ($P_{n0*T}$, $L_{m0*T}$) if (n0−0.5)*T≦P≦ (n0+0.5)*T and (m0−0.5)*T≦L≦(m0+0.5)*T.

After deriving the number of data sets (L, P) corresponding to each of the data set types ($L_{nT}$, $P_{mT}$) and the number of data sets (P, L) corresponding to each of the data set types ($P_{nT}$, $L_{mT}$), the MPU calculates average length sets ($\underline{L}_{nT}$, $\underline{P}_{mT}$) corresponding to the data set types ($L_{nT}$, $P_{mT}$) respectively, and calculates average length sets ($\underline{P}_{nT}$, $\underline{L}_{mT}$) corresponding to the data set types ($P_{nT}$, $L_{mT}$) respectively, where the average lengths $\underline{L}_{nT}$ and $\underline{P}_{mT}$ respectively represent the average values of the lengths L and P of the data set types ($L_{nT}$, $P_{mT}$), and the average lengths $\underline{P}_{nT}$ and $\underline{L}_{mT}$ respectively represent the average values of the lengths P and L of the data set types ($P_{nT}$, $L_{mT}$). For example, the average lengths $\underline{L}_{n0*T}$ and $\underline{P}_{m0*T}$ respectively represent the average values of the lengths L and P of the data set type ($L_{n0*T}$, $P_{m0*T}$), and the average lengths $\underline{P}_{n0*T}$ and $\underline{L}_{m0*T}$ respectively represent the average values of the lengths P and L of the data set type ($P_{n0*T}$, $L_{m0*T}$).

After calculating the average length sets $\underline{L}_{nT}$, $\underline{P}_{mT}$), the calculation results ($\Delta \underline{L}_{nT}$, $\Delta \underline{P}_{mT}$) corresponding to the data set types ($L_{nT}$, $P_{mT}$) can be derived respectively from the following equations:

$$\Delta \underline{L}_{nT} = \underline{L}_{nT} - nT$$

$$\Delta \underline{P}_{mT} = \underline{P}_{mT} - mT$$

Similarly, after calculating the average length sets ($\underline{P}_{nT}$, $\underline{L}_{mT}$), the calculation results ($\Delta \underline{P}_{nT}$, $\Delta \underline{L}_{mT}$) corresponding to the data set types ($P_{nT}$, $L_{mT}$), respectively, can be derived from the following equations:

$$\Delta \underline{P}_{nT} = \underline{P}_{nT} - nT$$

$$\Delta \underline{L}_{mT} = \underline{L}_{mT} - mT$$

In Step 920, the MPU executing the firmware code determines if tuning the write strategy parameters is needed. If any of the length deviation values $\Delta \underline{L}_{nT}$, $\Delta \underline{P}_{mT}$, $\Delta \underline{P}_{nT}$, or $\Delta \underline{L}_{mT}$ of the calculation results ($\Delta \underline{L}_{nT}$, $\Delta \underline{P}_{mT}$) and ($\Delta \underline{P}_{nT}$, $\Delta \underline{L}_{mT}$) is greater than a specific threshold, the MPU executing the firmware code determines that tuning the write strategy parameters is needed, so Step 922 will be executed; otherwise, enter Step 910E. Please note, for the first time of executing Step 920, the MPU may determine to enter Step 922 directly without any consideration if the initial values of the write strategy parameters are sure to be imperfect. In addition, although the write strategy parameters described in Step 920 and 922 are plural for simplicity as shown in FIG. 2, this is not a limitation of the present invention. Both Step 920 and 922 can be described utilizing a singular form of "write strategy parameter" if tuning only a single write strategy parameter is needed. Repeated explanation of the singular or plural form for similar situations is therefore unnecessary in the following.

If determining to enter Step 922, the MPU executing the firmware code then tunes the write strategy parameters according to calculation results ($\Delta \underline{L}_{nT}$, $\Delta \underline{P}_{mT}$) and ($\Delta \underline{P}_{nT}$, $\Delta \underline{L}_{mT}$), respectively. According to this embodiment, the write strategy parameters include $F_{i,k}$ and $R_{j,k}$ for controlling beginning locations of the pits and the lands, respectively, where i=0, 1, . . . , 80 corresponding to all the data set types ($L_{nT}$, $P_{mT}$), j=0, 1, . . . , 80 corresponding to all the data set types ($P_{nT}$, $L_{mT}$), and k is a loop index corresponding to the number of times for write strategy tuning (i.e. tuning the write strategy parameters). In this embodiment, $F_{i,O}$ and $R_{j,O}$ represent the initial values of the write strategy parameters corresponding to the combination indexes i and j, respectively, and $F_{i,l}$ and $R_{j,l}$ represent latest values of the write strategy parameters corresponding to the combination indexes i and j at the first time that Step 922 is executed for the combination indexes i and j, respectively. Accordingly, $F_{i,k}$ and $R_{j,k}$ represent latest values of the write strategy parameters corresponding to the combination indexes i and j at the $k^{th}$ time that Step 922 is executed for the combination indexes i and j, respectively.

Please note that the number of data set types ($L_{nT}$, $P_{mT}$) and ($P_{nT}$, $L_{mT}$) according to another embodiment implemented for the DVD±R disc mentioned above can be derived as follows:

$$10*10*2=200;$$

since n=3, 4, . . . , 11, 14 and m=3, 4, . . . , 11, 14 for the DVD±R disc. In addition, as long as the implementation of the present invention is not hindered, not all the average length sets mentioned above should be calculated according to another embodiment of the present invention. It is unnecessary to tune all the write strategy parameters simultaneously if the performance in some specific combination(s) out of all the combinations (nT, mT) respectively related to the data set types ($L_{nT}$, $P_{mT}$) and ($P_{nT}$, $L_{mT}$) is acceptable.

Figure 3:
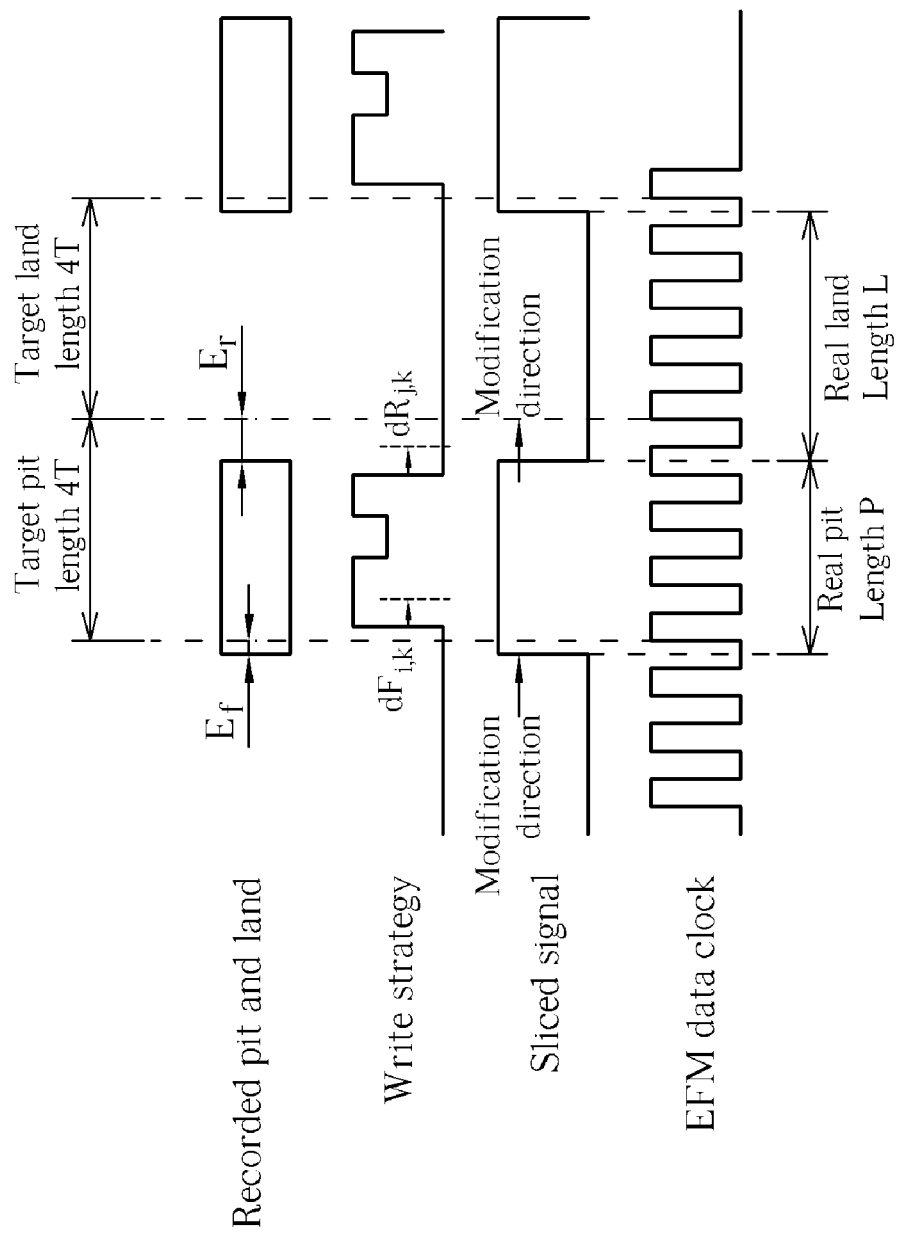
FIG. 3 is a length compensation illustration of the method shown in FIG. 2.

FIG. 3 illustrates a length compensation illustration of the method 910 shown in FIG. 2, wherein a pit having a target pit length of 4 T followed by an adjacent land having a target land length of 4 T is taken as an example. The values $E_f$ and $E_r$ shown in FIG. 3 respectively represent a fore location error and a rear location error of the pit, and it is obvious that the value $E_r$ also represents a fore location error of the following land. As shown in FIG. 3, the compensation values $dF_{i,k}$ and $dR_{j,k}$ are utilized for tuning the write strategy parameters $F_{i,k}$ and $R_{j,k}$, respectively, where the compensation values $dF_{i,k}$ and $dR_{j,k}$ can be derived from the following equations:

$$dF_{i,k} = G_{i,k,L} * \Delta \underline{L}_{nT} - G_{i,k,P} * \Delta \underline{P}_{mT}$$

$$dR_{j,k} = H_{j,k,P} * \Delta \underline{P}_{nT} - H_{j,k,L} * \Delta \underline{L}_{mT}$$

Through multiplying the calculation results $\Delta \underline{L}_{nT}$, $\Delta \underline{P}_{mT}$, $\Delta \underline{P}_{nT}$, and $\Delta \underline{L}_{mT}$ by the weighted factors $G_{i,k,L}$, $G_{i,k,P}$, $H_{j,k,P}$, and $H_{j,k,L}$, respectively, the MPU is capable of adjusting the calculation results $\Delta \underline{L}_{nT}$, $\Delta \underline{P}_{mT}$, $\Delta \underline{P}_{nT}$, and $\Delta \underline{L}_{mT}$ with the weighted factors $G_{i,k,L}$, $G_{i,k,P}$, $H_{j,k,P}$, and $H_{j,k,L}$ to generate the adjusted results ($G_{i,k,L} * \Delta \underline{L}_{nT}$), ($G_{i,k,P} * \Delta \underline{P}_{mT}$), ($H_{j,k,P} * \Delta \underline{P}_{nT}$), and ($H_{j,k,L} * \Delta \underline{L}_{mT}$), which are utilized for tuning the write strategy parameters $F_{i,k}$ and $R_{j,k}$ as shown in the equations mentioned above. Then the MPU may tune the write strategy parameters $F_{i,k}$ and $R_{j,k}$ according to the following equations:

$$F_{i,k+1} = F_{i,k} + dF_{i,k}$$

$$R_{j,k+1} = R_{j,k} + dR_{j,k}$$

Please note that in order to get better performance of the write strategy tuning for the materials currently applicable to the optical storage medium, the weighted factors $G_{i,k,L}$, $G_{i,k,P}$, $H_{j,k,P}$, and $H_{j,k,L}$ can be set to values less than 1 and can be set to have decreasing values while k increases. However, this is not a limitation of the present invention. In addition, in a special case of the first embodiment, either the weighted factors $G_{i,k,L}$ and $H_{j,k,P}$ can be set to zero values or the weighted factors $G_{i,k,P}$ and $H_{j,k,L}$ can be set to zero values in order to save the calculation loading of the write strategy tuning and save the storage volume requirement of memory resources such as the memory 120 and other memories of other embodiments utilized during the write strategy tuning.

In Step 924, the optical storage device then writes data on the optical storage medium utilizing the latest values of the write strategy parameters $F_{i,k}$ and $R_{j,k}$. After executing Step 924, Step 914 is executed. As a result, the working flow of the method 910 runs until the write strategy parameters are tuned to reach a predetermined precision set by Step 920 utilizing criteria such as the specific threshold mentioned above.

After retaining the teaching related to the method 910, those skilled in the art would understand that at least a portion of the steps shown in FIG. 2 can be executed by various kinds of devices implemented utilizing hardware, software, or combinations of hardware, software, etc. according to another embodiment of the present invention. For example, according to the case that the computer executing the application program performs the calculations mentioned above, Step 918, 920, and/or 922 can be executed by the computer executing the application program. According to this case, the lengths L and P can be sent to the computer executing the application program, so the computer executing the application program may classify the length sets (L, P) and (P, L), and calculate the average length deviations such as the calculation results ($\Delta L_{nT}$, $\Delta P_{mT}$) and ($\Delta P_{nT}$, $\Delta L_{mT}$) mentioned above. According to an implementation choice of the present invention, the computer executing the application program may determine if tuning the write strategy parameters is needed. According to various implementation choices, the computer executing the application program or the MPU executing the firmware code may calculate the latest values of the write strategy parameters $F_{i,k}$ and $R_{j,k}$ if tuning the write strategy parameters is needed. According to an implementation choice that the computer executing the application program calculates the latest values of the write strategy parameters $F_{i,k}$ and $R_{j,k}$, the computer executing the application program may send the latest values of the write strategy parameters $F_{i,k}$ and $R_{j,k}$ or the compensation values $dF_{i,k \, and \, dRj,k}$ back to the optical storage device. According to various implementation choices, the computer executing the application program or the MPU executing the firmware code may tune the write strategy parameters $F_{i,k}$ and $R_{j,k}$, so the MPU executing the firmware code may write data on the optical storage medium utilizing the latest values of the write strategy parameters $F_{i,k}$ and $R_{j,k}$. After executing Step 924, Steps 914–920 are executed to check if further write strategy tuning is required.

Figure 4:
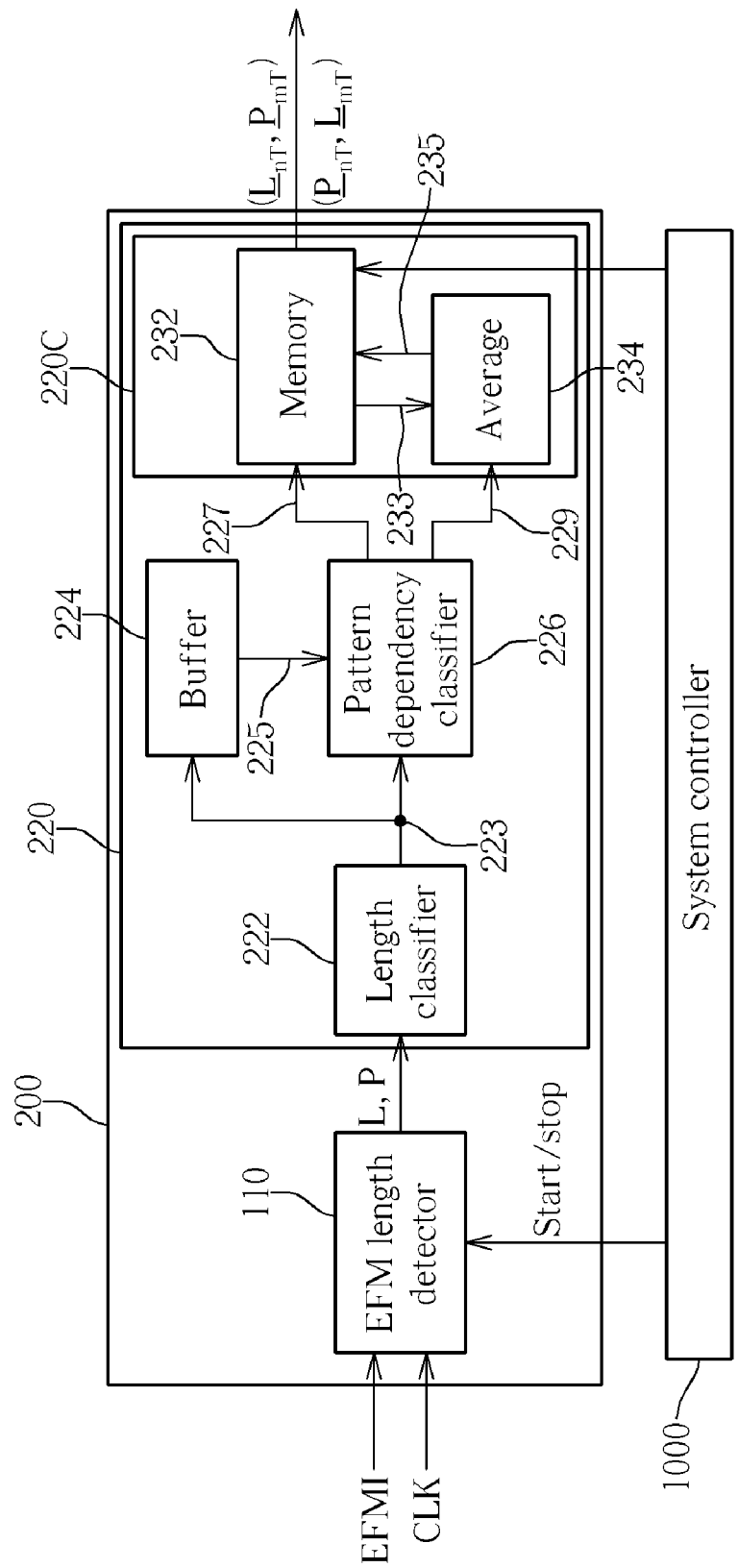
FIG. 4 is a diagram of a combination of a system controller and an average EFM length measurement device according to an embodiment of the present invention.

FIG. 4 illustrates a diagram of a system controller 1000 coupled to an average EFM length measurement device 200 according to a second embodiment of the present invention. In addition to the EFM length detector 110 shown in FIG. 1, the average EFM length measurement device 200 of the second embodiment further includes a calculation module 220 for executing a portion of Step 918 to generate the average length sets ($L_{nT}$, $P_{mT}$) and ($P_{nT}$, $L_{mT}$) as the calculation results of the average EFM length measurement device 200, and then the MPU executing another firmware code may complete the rest of the calculations disclosed by Step 918.

As shown in FIG. 4, the calculation module 220 includes a length classifier 222, a buffer 224, a pattern dependency classifier 226, and a calculator 220C, and the calculator 220C includes a memory 232 and an average unit 234. According to the second embodiment, the length classifier 222 is capable of identifying each of the pit lengths P with one of the target pit lengths, which may be the lengths of 3 T, 4 T, . . . or, 11 T. Similarly, the length classifier 222 is also capable of identifying each of the land lengths L with one of the target land lengths, which are the lengths of 3 T, 4 T, . . . , 11 T. According to this embodiment, the length classifier 222 encodes a length L or P together with the corresponding target length (i.e. what the length L or P is classified to be) to generate an encoded data 223 having information of the length (length L or P) and the corresponding target length. The buffer 224 buffers the encoded data 223 and outputs the buffered data 225. Here if the encoded data 223 corresponds to a current length, the buffered data 225 corresponds to a previous length. As a result, the buffer 224 buffers the previous length for further forming, in the pattern dependency classifier 226, a data set (L, P) or (P, L) including the previous length and the current length.

The pattern dependency classifier 226 then classifies the data sets (L, P) into the data set types ($L_{nT}$, $P_{mT}$) by storing each of the data sets (L, P) into one of a plurality of regions respectively corresponding to the data set types ($L_{nT}$, $P_{mT}$) in the memory 232. Similarly, the pattern dependency classifier 226 also classifies the data sets (P, L) into the data set types ($P_{nT}$, $L_{mT}$) by storing each of the data sets (P, L) into one of a plurality of regions respectively corresponding to the data set types ($P_{nT}$, $L_{mT}$) in the memory 232.

For a specific data set type out of the data set types ($L_{nT}$, $P_{mT}$), the average unit 234 is capable of averaging the lengths L corresponding to lands to generate an average length $\underline{L}_{nT}$ corresponding to the specific data set type and is capable of averaging the lengths P corresponding to pits to generate an average length $\underline{P}_{mT}$ corresponding to the specific data set type. Similarly, for a specific data set type out of the data set types ($P_{nT}$, $L_{mT}$), the average unit 234 is capable of averaging the lengths P corresponding to pits to generate an average length $\underline{P}_{nT}$ corresponding to the specific data set type and is capable of averaging the lengths L corresponding to lands to generate an average length $\underline{L}_{mT}$ corresponding to the specific data set type.

According to this embodiment, the average unit 234 is implemented utilizing a moving average unit. In addition, for each of the data set types ($L_{nT}$, $P_{mT}$), e.g. the data set type ($L_{nT}$, $P_{mT}$) having n=n0 and m=m0, the average unit 234 averages the lengths L corresponding to lands and averages the lengths P corresponding to pits to generate an average length set ($\underline{L}_{n0*T}$, $\underline{P}_{m0*T}$) corresponding to the data set type ($L_{n0*T}$, $P_{m0*T}$). As a result, the calculator 220C may utilize the data sets (L, P) corresponding to the data set type ($L_{n0*T}$, $P_{m0*T}$) to generate the calculation result ($\underline{L}_{n0*T}$, $\underline{P}_{m0*T}$) for the data set type ($L_{n0*T}$, $P_{m0*T}$). In general, the calculator 220C generates the calculation results ($\underline{L}_{nT}$, $\underline{P}_{mT}$) for the data set types ($L_{nT}$, $P_{mT}$), respectively.

Similarly, for each of the data set types ($P_{nT}$, $L_{mT}$), e.g. the data set type ($P_{nT}$, $L_{mT}$) having n=n0 and m=m0, the average unit 234 averages the lengths L corresponding to lands and averages the lengths P corresponding to pits to generate an average length set ($\underline{P}_{n0*T}$, $\underline{L}_{m0*T}$) corresponding to the data set type ($P_{n0*T}$, $L_{m0*T}$). As a result, the calculator 220C may utilize the data sets (P, L) corresponding to the data set type ($P_{n0*T}$, $L_{m0*T}$) to generate the calculation result ($\underline{P}_{n0*T}$, $\underline{L}_{m0*T}$) for the data set type ($P_{n0*T}$, $L_{m0*T}$). In general, the calculator 220C generates the calculation results ($\underline{P}_{nT}$, $\underline{L}_{mT}$) for the data set types ($P_{nT}$, $L_{mT}$), respectively.

Similar to the first embodiment, in a special case of the second embodiment, either the weighted factors $G_{i,k,L}$ and $H_{j,k,P}$ can be set to zero values or the weighted factors $G_{i,k,P}$ and $H_{j,k,L}$ can be set to zero values in order to save the calculation loading of the write strategy tuning and save the storage volume requirement of the memory resources such as the memory 232 utilized during the write strategy tuning. In this special case, the calculator 220C may generate either the average lengths $\underline{L}_{nT}$ or the average lengths $\underline{P}_{mT}$ as the calculation results (i.e. outputs of the calculation module 220) for the data set types ($L_{nT}$, $P_{mT}$), respectively. Similarly, the calculator 220C may generate either the average lengths $\underline{P}_{nT}$ or the average lengths $\underline{L}_{mT}$ as the calculation results for the data set types ($P_{nT}$, $L_{mT}$), respectively.

Figure 5:
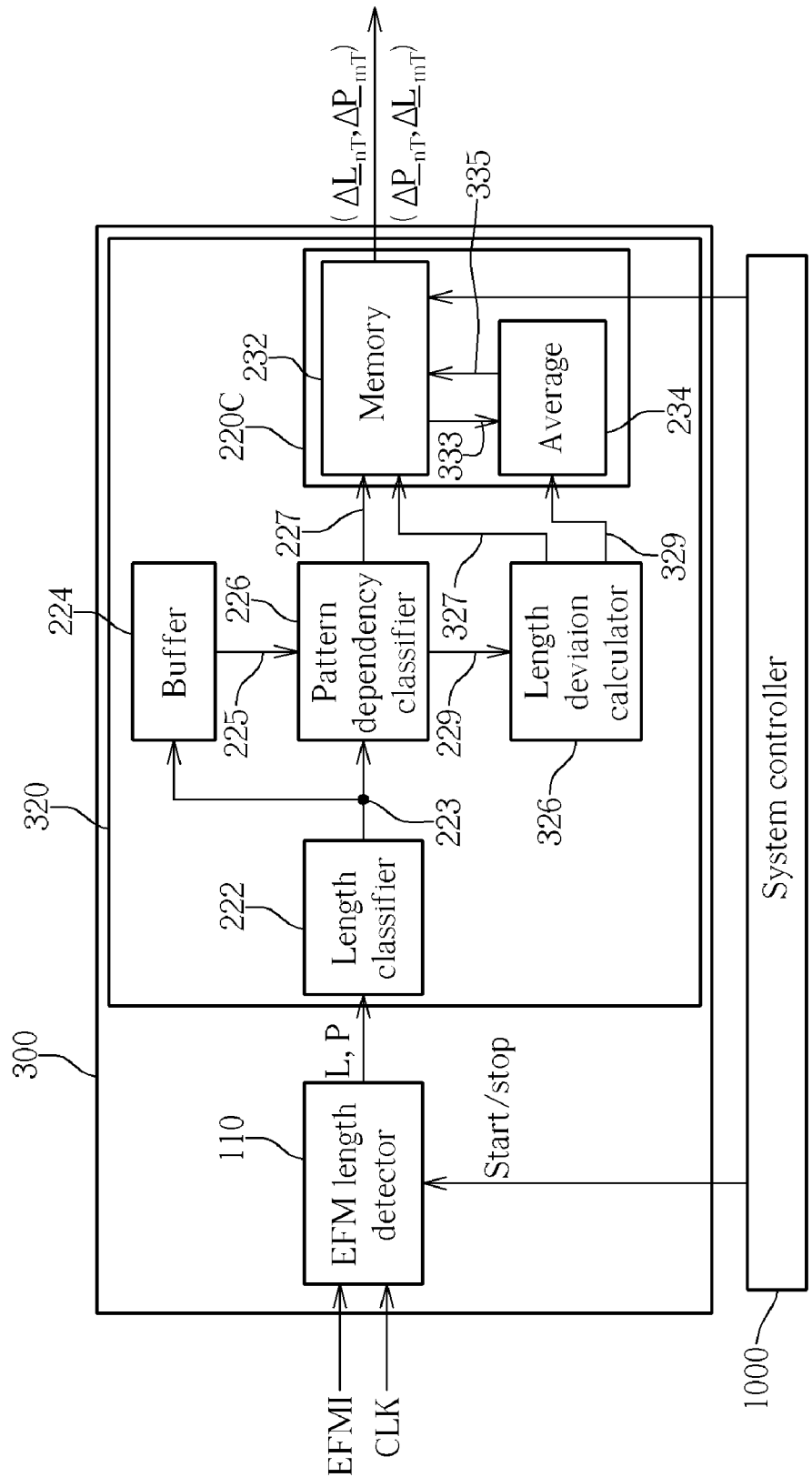
FIG. 5 is a diagram of a combination of a system controller and an average EFM length deviation measurement device according to an embodiment of the present invention.

Please refer to FIG. 5 illustrating a diagram of a system controller 1000 coupled to an average EFM length deviation measurement device 300 according to a third embodiment of the present invention. In addition to the EFM length detector 110 shown in FIG. 1, the average EFM length deviation measurement device 300 of the third embodiment further includes a calculation module 320 utilized for executing a portion of Step 918 to generate average length deviation sets ($\Delta L_{nT}$, $\Delta P_{mT}$) and ($\Delta P_{nT}$, $\Delta L_{mT}$) as the calculation results of the average EFM length deviation measurement device 300.

In addition to the length classifier 222, the buffer 224, the pattern dependency classifier 226, and the calculator 220C shown in FIG. 4, the calculation module 320 shown in FIG. 5 further includes a length deviation calculator 326. According to the third embodiment, the pattern dependency classifier 226 further outputs the lengths L and P of the data sets (L, P) and (P, L) to the length deviation calculator 326. As mentioned above, the length classifier 222 encodes the length L or P together with the corresponding target length (i.e. what the length L or P is classified to be) to generate the encoded data 223 having the information of the length (length L or P) and the corresponding target length, so such information can be transmitted between two elements of the calculation module such as the calculation module 220 of the second embodiment and the calculation module 320 of the third embodiment.

As a result, when receiving the lengths L and P of the data sets (L, P) transmitted utilizing the encoded data 229, the length deviation calculator 326 may simply replace the lengths L and P of the data sets (L, P) corresponding to the data set types ($L_{nT}$, $P_{mT}$) with corresponding length deviation values $\Delta L_{nT}$ and $\Delta P_{mT}$, respectively, wherein the length deviation calculator 326 calculates the length deviation values $\Delta L_{nT}$ and $\Delta P_{mT}$ according to the following equations:

$$\Delta L_{nT} = L - nT$$

$$\Delta P_{mT} = P - mT$$

Similarly, when receiving the lengths P and L of the data sets (P, L) transmitted utilizing the encoded data 229, the length deviation calculator 326 may simply replace the lengths P and L of the data sets (P, L) corresponding to the data set types ($P_{nT}$, $L_{mT}$) with corresponding length deviation values $\Delta P_{nT}$ and $\Delta L_{mT}$, respectively, wherein the length deviation calculator 326 calculates the length deviation values $\Delta P_{nT}$ and $\Delta L_{mT}$ according to the following equations:

$$\Delta P_{nT} = P - nT$$

$$\Delta L_{mT} = L - mT$$

As a result of the circuit coupling shown in FIG. 5, for each of the data set types ($L_{nT}$, $P_{mT}$), the calculator 220C may simply calculate the average values $\Delta L_{nT}$ of length deviation values $\Delta L_{nT}$, respectively, rather than the average values $\underline{L}_{nT}$, and calculate the average values $\Delta \underline{P}_{mT}$ of length deviation values $\Delta P_{mT}$, respectively, rather than the average values $\underline{P}_{mT}$. Similarly, for each of the data set types ($P_{nT}$, $L_{mT}$), the calculator 220C may simply calculate the average values $\Delta \underline{P}_{nT}$ of length deviation values $\Delta P_{nT}$, respectively, rather than the average values $\underline{P}_{nT}$, and calculate the average values $\Delta \underline{L}_{mT}$ of length deviation values $\Delta L_{mT}$, respectively, rather than the average values $\underline{L}_{mT}$.

Similar to the first embodiment, in a special case of the third embodiment, either the weighted factors $G_{i,k,L}$ and $H_{j,k,P}$ can be set to zero values or the weighted factors $G_{i,k,P}$ and $H_{j,k,L}$ can be set to zero values in order to save the calculation loading of the write strategy tuning and save the storage volume requirement of the memory resources such as the memory 232 utilized during the write strategy tuning. In this special case, the calculator 220C may generate either the average values $\Delta \underline{L}_{nT}$ or the average values $\Delta \underline{P}_{mT}$ as the calculation results (i.e. the outputs of the calculation module 220) for the data set types ($L_{nT}$, $P_{mT}$), respectively. Similarly, the calculator 220C may generate either the average values $\Delta \underline{P}_{nT}$ or the average values $\Delta \underline{L}_{mT}$ as the calculation results for the data set types ($P_{nT}$, $L_{mT}$), respectively.

In a variation of the second embodiment, a length deviation calculator coupled to the average EFM length measurement device 200 is utilized for executing a portion of Step 918 to generate the average length deviation sets ($\Delta \underline{L}_{nT}$, $\Delta \underline{P}_{mT}$) and ($\Delta \underline{P}_{nT}$, $\Delta \underline{L}_{mT}$) through similar calculations as those disclosed above. The length deviation calculator of this variation generates the average length deviation sets ($\Delta \underline{L}_{nT}$, $\Delta \underline{P}_{mT}$) and ($\Delta \underline{P}_{nT}$, $\Delta \underline{L}_{mT}$) according to the calculation results ($\underline{L}_{nT}$, $\underline{P}_{mT}$) and ($\underline{P}_{nT}$, $\underline{L}_{mT}$) received from the average EFM length measurement device 200 and outputs the average length deviation sets ($\Delta \underline{L}_{nT}$, $\Delta \underline{P}_{mT}$) and ($\Delta \underline{P}_{nT}$, $\Delta \underline{L}_{mT}$), so as mentioned, the MPU executing the firmware code or the computer executing the application program may utilize the average length deviation sets ($\Delta \underline{L}_{nT}$, $\Delta \underline{P}_{mT}$) and ($\Delta \underline{P}_{nT}$, $\Delta \underline{L}_{mT}$) outputted from the length deviation calculator of this variation to continue some other step(s) such as Steps 920 and/or 922.

Please note that since an averaging result of the averaging operation is proportional to a summing result of the summing operation for the same group of data, the average unit 234 can be replaced with a summing unit according to another embodiment of the present invention. Therefore, the averaging operation of the average unit 234 is replaced with the summing operation of the summing unit. After retaining the teachings of the present invention, those skilled in the art should understand that variations of such calculations can be applied to other embodiments of the present invention.

In addition, although in the embodiments mentioned above, each of the data set types corresponds to a combination of a specific target pit length and a specific target land length or a combination of a specific target land length and a specific target pit length, it is not a limitation of the present invention. Please note that in other embodiments of the present invention, each or one of the data set types may correspond to a combination of at least a specific target pit length and specific target land lengths, or a combination of at least a specific target land length and specific target pit lengths, or a combination of specific target land lengths and specific target pit lengths. As a result, the write strategy parameters can be tuned further according to more adjacent pits or lands.

It should be noted that the present invention can be implemented by means of hardware including a plurality of distinct elements, or by means of a suitably programmed computer. In the system claim enumerating a plurality of means, several of these means can be embodied by one and the same item of hardware.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for tuning a plurality of write strategy parameters of an optical storage device, the method comprising:
    detecting a plurality of lengths, each length corresponding to a pit or a land on an optical storage medium accessed by the optical storage device;
    performing calculations according to the lengths and a plurality of data set types to generate a plurality of calculation results respectively corresponding to the data set types, each of the data set types corresponding to a combination of at least a specific target pit length and a specific target land length or a combination of at least a specific target land length and a specific target pit length, the combination corresponding to a specific write strategy parameter; and
    utilizing the calculation results for tuning the write strategy parameters respectively corresponding to the data set types.

2. The method of claim 1, wherein the step of detecting the lengths further comprises:
    detecting the lengths according to a reproduced signal generated by the optical storage device accessing the optical storage medium.

3. The method of claim 2, wherein the step of detecting the lengths further comprises:
    slicing the reproduced signal to generate a sliced signal; and
    detecting intervals between rising edges and falling edges of the sliced signal as the lengths, each interval corresponding to a pit or a land.

4. The method of claim 1, further comprising:
    tuning the write strategy parameters automatically on system or on chip.

5. The method of claim 1, wherein the step of performing the calculations according to the lengths and the data set types further comprises:
    classifying a plurality of data sets into the data set types, each data set comprising lengths corresponding to a pit and an adjacent land or lengths corresponding to a land and an adjacent pit, respectively; and
    utilizing a plurality of data sets corresponding to a data set type to generate a calculation result for the data set type.

6. The method of claim 5, wherein the step of performing the calculations according to the lengths and the data set types further comprises:
    identifying one of the lengths with one of the target pit lengths or one of the target land lengths for further classifying the data sets into the data set types.

7. The method of claim 5, wherein the step of performing the calculations according to the lengths and the data set types further comprises:
    buffering a previous length for forming a data set including the previous length and a current length.

8. The method of claim 1, wherein the step of performing the calculations according to the lengths and the data set types further comprises:
    for each of the data set types, averaging a plurality of lengths to generate a calculation result corresponding to the data set type, wherein the lengths utilized in averaging for one of the data set types correspond to pits, or the lengths utilized in averaging for one of the data set types correspond to lands, or the lengths utilized in averaging for one of the data set types comprise lengths corresponding to lands and lengths corresponding to pits.

9. The method of claim 1, wherein the step of performing the calculations according to the lengths and the data set types further comprises:
    for each of the data set types, summing a plurality of lengths to generate a calculation result corresponding to the data set type, wherein the lengths utilized in summing for one of the data set types correspond to pits, or the lengths utilized in summing for one of the data set types correspond to lands, or the lengths utilized in summing for one of the data set types comprise lengths corresponding to lands and lengths corresponding to pits.

10. The method of claim 1, wherein the step of performing the calculations according to the lengths and the data set types further comprises:
    calculating a plurality of differences comprising first differences or second differences, each of the differences being between a length corresponding to a pit and a target pit length, or each of the differences being between a length corresponding to a land and a target land length; and
    for one of the data set types, averaging a plurality of first differences and/or averaging a plurality of second differences to generate a calculation result corresponding to the data set type.

11. The method of claim 1, wherein the step of performing the calculations according to the lengths and the data set types further comprises:
    calculating a plurality of differences comprising first differences or second differences, each of the differences being between a length corresponding to a pit and a target pit length, or each of the differences being between a length corresponding to a land and a target land length; and
    for one of the data set types, summing a plurality of first differences and/or summing a plurality of second differences to generate a calculation result corresponding to the data set type.

12. The method of claim 1, wherein in the step of performing the calculations according to the lengths and the data set types, each of the data set types corresponds to a combination of at least a specific target pit length and specific target land lengths, or a combination of at least a specific target land length and specific target pit lengths, or a combination of specific target land lengths and specific target pit lengths.

13. The method of claim 1, wherein the step of utilizing the calculation results further comprises:
    adjusting the calculation results with at least a weighted factor to generate a plurality of adjusted results corresponding to the calculation results, respectively; and
    utilizing the adjusted results to tune the write strategy parameters corresponding to each of the data set types.

14. A system for tuning a plurality of write strategy parameters of an optical storage device, the system comprising:
- a detector for detecting a plurality of lengths, each length corresponding to a pit or a land on an optical storage medium accessed by the optical storage device;
- a calculation module coupled to the detector for performing calculations according to the lengths and a plurality of data set types to generate a plurality of calculation results respectively corresponding to the data set types, each of the data set types corresponding to a combination of at least a specific target pit length and a specific target land length or a combination of at least a specific target land length and a specific target pit length, the combination corresponding to a specific write strategy parameter; and
- a controller coupled to the detector and the calculation module, the controller utilizing the calculation results for tuning the write strategy parameters respectively corresponding to the data set types.

15. The system of claim 14, wherein the detector detects the lengths according to a reproduced signal generated by the optical storage device accessing the optical storage medium.

16. The system of claim 15, wherein a slicer of the optical storage device slices the reproduced signal to generate a sliced signal, the detector detects intervals between rising edges and falling edges of the sliced signal as the lengths, and each interval corresponds to a pit or a land.

17. The system of claim 14, wherein the write strategy parameters are tuned automatically on system or on chip.

18. The system of claim 14, wherein the calculation module further comprises:
- a pattern dependency classifier for classifying a plurality of data sets into the data set types, each data set comprising lengths corresponding to a pit and an adjacent land or lengths corresponding to a land and an adjacent pit, respectively; and
- a calculator coupled to the classifier for utilizing a plurality of data sets corresponding to a data set type to generate a calculation result for the data set type.

19. The system of claim 18, wherein the calculation module further comprises:
- a length classifier for identifying one of the lengths with one of the target pit lengths or one of the target land lengths for further classifying the data sets into the data set types.

20. The system of claim 18, wherein the calculation module further comprises:
- a buffer for buffering a previous length for forming a data set including the previous length and a current length.

21. The system of claim 14, wherein the calculation module further comprises:
- an average unit, for each of the data set types, the average unit averaging a plurality of lengths to generate a calculation result corresponding to the data set type, wherein the lengths utilized in averaging for one of the data set types correspond to pits, or the lengths utilized in averaging for one of the data set types correspond to lands, or the lengths utilized in averaging for one of the data set types comprise lengths corresponding to lands and lengths corresponding to pits.

22. The system of claim 14, wherein the calculation module further comprises:
- a summing unit, for each of the data set types, the summing unit summing a plurality of lengths to generate a calculation result corresponding to the data set type, wherein the lengths utilized in summing for one of the data set types correspond to pits, or the lengths utilized in summing for one of the data set types correspond to lands, or the lengths utilized in summing for one of the data set types comprise lengths corresponding to lands and lengths corresponding to pits.

23. The system of claim 14, wherein the calculation module further comprises:
- a length deviation calculator for calculating a plurality of differences comprising first differences or second differences, each of the differences being between a length corresponding to a pit and a target pit length, or each of the differences being between a length corresponding to a land and a target land length; and
- an average unit coupled to the length deviation calculator, for one of the data set types, the average unit averaging a plurality of first differences and/or averaging a plurality of second differences to generate a calculation result corresponding to the data set type.

24. The system of claim 14, wherein the calculation module further comprises:
- a length deviation calculator for calculating a plurality of differences comprising first differences or second differences, each of the differences being between a length corresponding to a pit and a target pit length, or each of the differences being between a length corresponding to a land and a target land length; and
- a summing unit coupled to the length deviation calculator, for one of the data set types, the summing unit summing a plurality of first differences and/or summing a plurality of second differences to generate a calculation result corresponding to the data set type.

25. The system of claim 14, wherein in the calculations performed by the calculation module, each of the data set types corresponds to a combination of at least a specific target pit length and specific target land lengths, or a combination of at least a specific target land length and specific target pit lengths, or a combination of specific target land lengths and specific target pit lengths.

26. The system of claim 14, wherein the controller is capable of adjusting the calculation results with at least a weighted factor to generate a plurality of adjusted results corresponding to the calculation results, respectively, and utilizing the adjusted results to tune the write strategy parameters corresponding to each of the data set types.

27. The system of claim 14, wherein the system is substantially the optical storage device.

28. The system of claim 14, wherein the system is a circuit positioned in the optical storage device, or the system is a circuit coupled to the optical storage device.

* * * * *

UNITED STATES PATENT AND TRADEMARK OFFICE
CERTIFICATE OF CORRECTION

PATENT NO.        : 7,006,420 B1
APPLICATION NO.   : 10/906397
DATED             : February 28, 2006
INVENTOR(S)       : Han-Wen Hsu, Chih-Ching Yu and Chih-Hsiung Chu It is certified that error appears in the above-identified patent and that said Letters Patent is hereby corrected as shown below:

Column 7,
Line 66, "$\underline{L}_{nT}$, $\underline{P}_{mT}$) and ($P_{nT}$, $L_{mT}$)" should read -- ($\underline{L}_{nT}$, $\underline{P}_{mT}$) and ($\underline{P}_{nT}$, $\underline{L}_{mT}$) --;

Column 10,
Line 23, "220" should read -- 320 --.

Signed and Sealed this

Twenty-fourth Day of July, 2007

JON W. DUDAS
*Director of the United States Patent and Trademark Office*